May 15, 1962 C. M. KLINE ETAL 3,034,667
RETRACTABLE ELEVATOR FOR GRAIN BIN
Filed Dec. 11, 1959 4 Sheets-Sheet 1
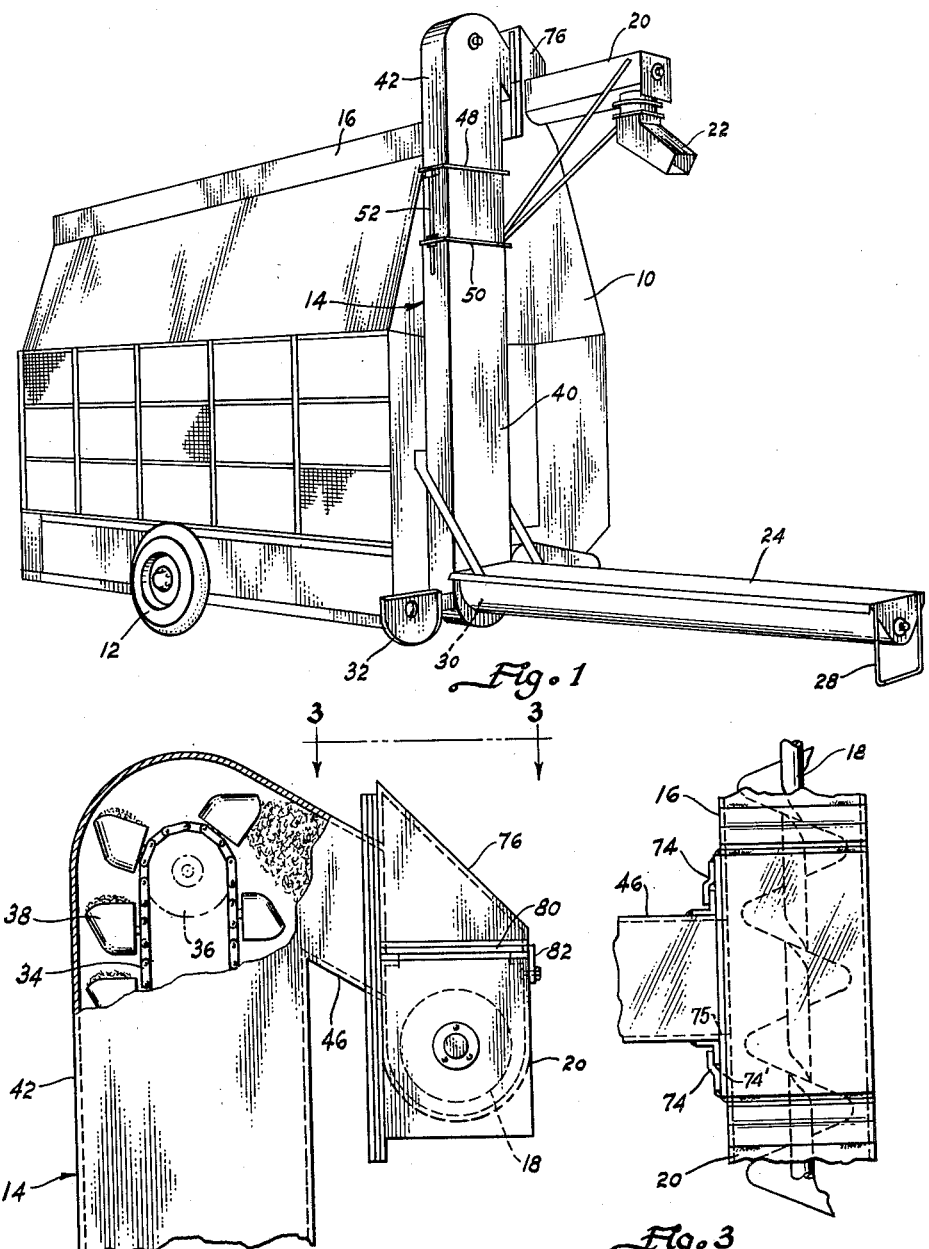
INVENTORS
CHARLES M. KLINE
WILLIAM HOBBS, JR.

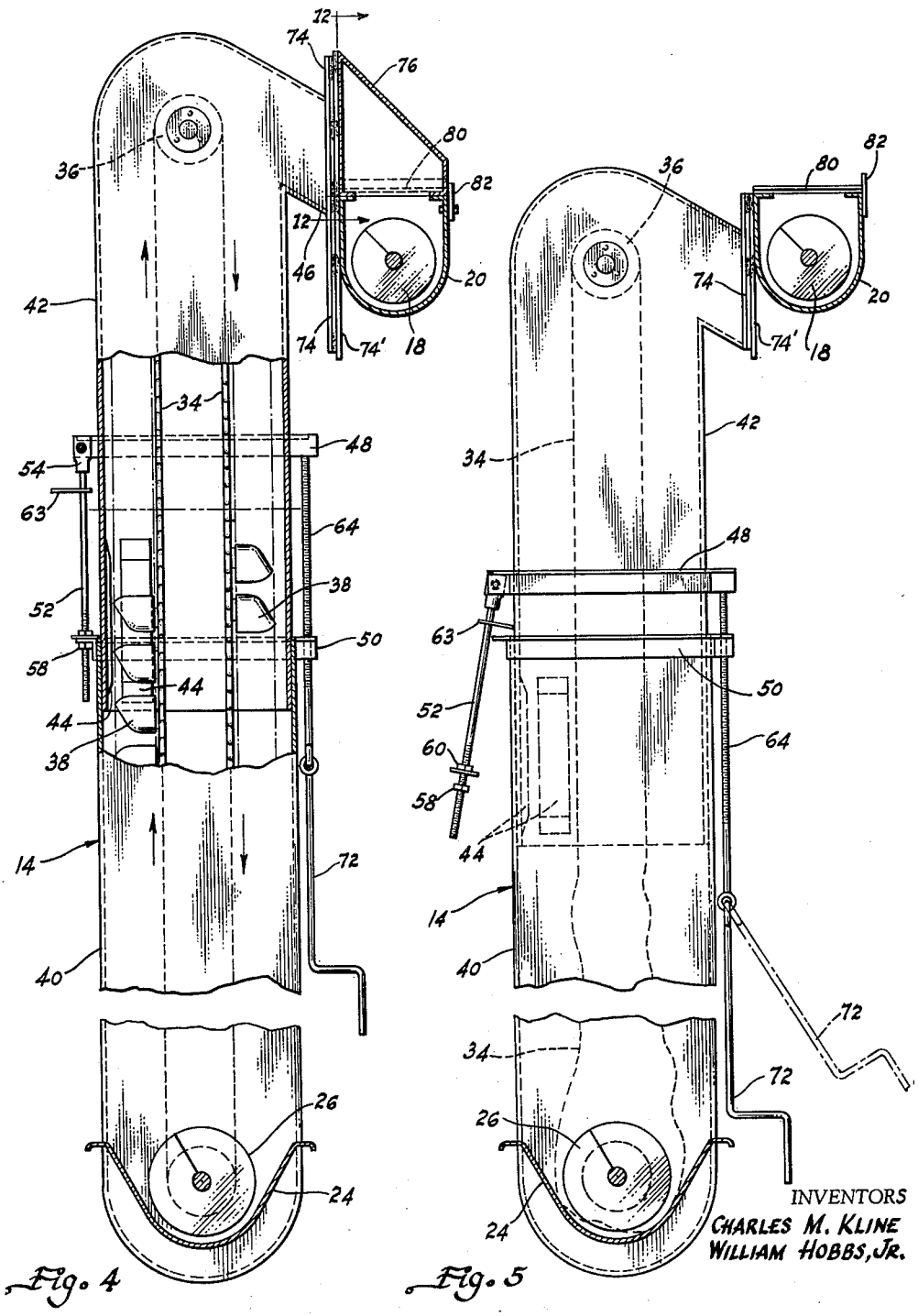

May 15, 1962  C. M. KLINE ETAL  3,034,667
RETRACTABLE ELEVATOR FOR GRAIN BIN
Filed Dec. 11, 1959  4 Sheets-Sheet 3

INVENTORS
CHARLES M. KLINE
WILLIAM HOBBS, JR.

INVENTORS
CHARLES M. KLINE
WILLIAM HOBBS, JR.

United States Patent Office 3,034,667
Patented May 15, 1962

1

3,034,667
RETRACTABLE ELEVATOR FOR GRAIN BIN
Charles M. Kline, Joanna, and William Hobbs, Jr., Lancaster, Pa., assignors to Sperry Rand Corporation, New Holland, Pa., a corporation of Delaware
Filed Dec. 11, 1959, Ser. No. 858,962
9 Claims. (Cl. 214—17)

This invention relates to improvements in an elevator for a grain bin and, more particularly, to a retractable elevator for a grain bin which, preferably, is portable and of substantial height to enable the bin to contain a large quantity of grain. The preferred portability of the grain bin renders it capable of readily being transported to various locations where it is needed such as a threshing field or shed, a grain collection point in a field, or otherwise.

It has been proposed heretofore to provide grain elevating means adjacent one end of a grain bin for serving a plurality of purposes incident to loading or unloading the grain bin. For example, grain bins of this type can be provided with a trough extending horizontally adjacent the bottom thereof and a feed auger moves grain along said trough to the grain elevating means by which the grain is elevated by an endless flexible conveyor having buckets thereon to raise the grain to the top of the bin and discharge it thereinto.

Such grain bins also frequently are provided with a feed auger in the lower portion thereof so as to progressively feed grain from the lower part of the bin to the lower portion of the grain elevating means at one end of the bin so as to raise the grain and discharge it through an elevated spout or other discharge means into any suitable receiving means such as an automobile truck, another storage bin or similar means, or otherwise.

In providing grain elevating means adjacent one end of a grain bin of the type described for example, it is preferred and desirable that the upper end of the elevating means extend a substantial distance, such as the order of about 18 inches or 2 feet, for example, above the top of the bin. Under circumstances where the grain bin already is of a substantial height, particularly for purposes of affording maximum capacity to the same, when the grain bin is transported over certain public highways, for example, it has been found that the grain elevating means of a desired additional height either will be in violation of the highway laws of certain states or the elevating means is too high to conveniently pass under trestles, bridges, and the like of conventional heights, as well as being capable of entry through the vehicle doors of buildings such as barns, storage sheds and the like.

It is the principal object of the present invention to provide a preferably portable grain bin which has grain elevating means adjacent one end thereof, the elevating means including a substantially vertical housing including a plurality of parts which are longitudinally movable relative to each other so as to enable the upper part of the housing to be retracted a substantial distance below its maximum elevated position so as not to extend appreciably above the top of the main portion of the bin, especially when the grain bin is being transported.

Another object of the invention is to provide operating means for retracting and elevating the upper portion of the housing for the elevator which can be operated expeditiously and with minimum of effort by only one person, the guiding structure for the moving section of the elevator housing also being such as to minimize friction and skewing while said section is being retracted or elevated.

A further object of the invention preferably is to utilize screw threaded actuating means for retracting and elevating the upper section of the housing for the conveyor,

2 and other positioning means are so designed that they supplement said screw threaded means but offer no impedance to the movement of the upper movable section of the housing during retraction and elevation thereof.

Still another object of the invention is to provide interfitting means between the upper section of the elevator housing and conveyor means at the top of the grain bin so as to afford interlocking therebetween and also provide fool-proof means for retaining cover structure upon the grain conducting means at the top of the bin, said cover means also being removable when the upper portion of the elevator housing is retracted so as to minimize the overall height of the grain bin.

Details of the foregoing objects and the invention, as well as other objects thereof, are set forth in the following specification and illustrated in the accompanying drawings comprising a part thereof.

In the drawings:

FIG. 1 is a perspective view of a portable grain bin having a grain elevator combined therewith at one end and positioned in its uppermost elevated position, said elevator embodying the principles of the present invention.

FIG. 2 is an enlarged end view of the upper portion of the grain elevator and grain conducting means of the grain bin combination shown in FIG. 1, part of the casing of the upper portion of the elevator being broken away to show details of the interior thereof.

FIG. 3 is a fragmentary plan view showing a portion of the grain conducting means illustrated in FIGS. 1 and 2 as seen along the line 3—3 of FIG. 2.

FIG. 4 is a side elevation, partly broken away to show details of the interior thereof, and illustrating the grain elevator connected to one end of the grain bin illustrated in FIG. 1, this view illustrating the elevator in its fully extended or elevated position.

FIG. 5 is a view similar to FIG. 4 but showing the upper portion of the elevator housing retracted so as to decrease the overall height of the elevator in accordance with the principles of the present invention.

FIG. 8 is a view of the elevator shown in FIGS. 4 and 5 from the side thereof opposite that from which FIG. 6 is seen and illustrating a second positioning and adjusting means for the upper section of the housing of the elevator shown in FIGS. 4 and 5.

Figure 13:
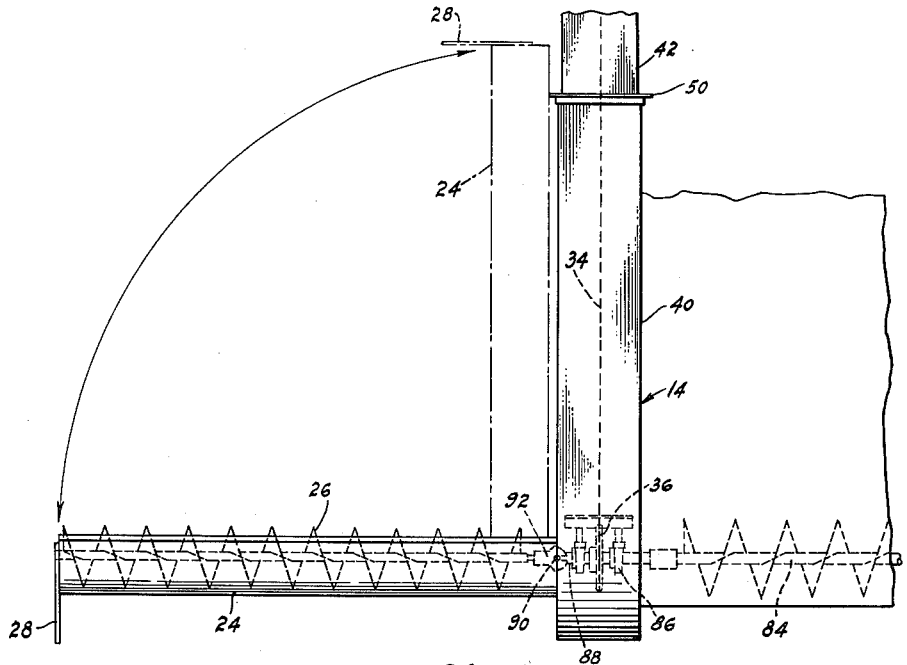

FIG. 13 is a fragmentary vertical elevation of the elevator end of the grain bin to illustrate particularly the bucket conveyor of the elevator and the feed auger positioned in the lower part of the grain bin, as well as a grain-receiving trough and feed auger pivotally connected to the lower part of the grain elevator and which is illustrated in full lines in vertical or folded position, and in broken lines in horizontal or extended position for purposes of receiving grain or the like.

Figure 14:
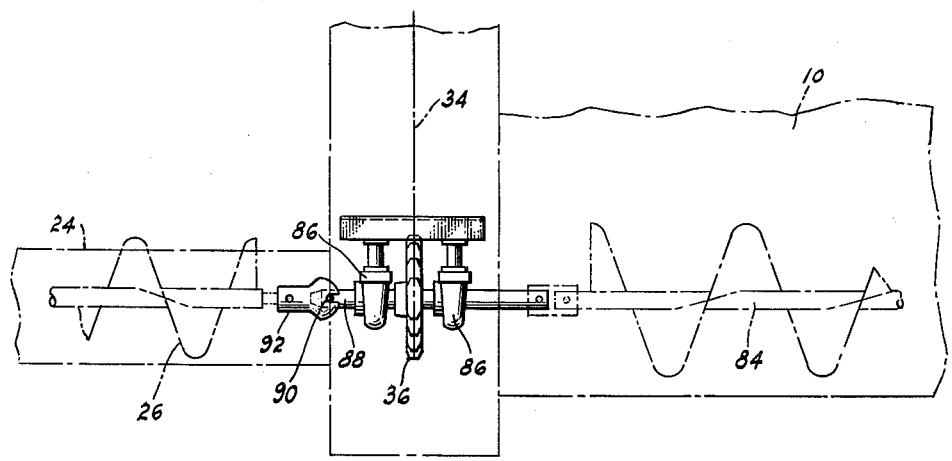

FIG. 14 is a fragmentary, vertical sectional view on a larger scale than employed in FIG. 13 and illustrating details of exemplary means for connecting the auger of the pivoted grain trough with the drive shaft for the grain bin auger and bucket elevator.

Referring to the drawings, FIG. 1 illustrates a perspective view of an exemplary portable grain bin 10 which is of substantial height and cubic content, whereby it is capable of holding a very substantial amount of grain or other similar pulverulent, preferably dry material. Any suitable means such as wheels 12 are provided to render the grain bin portable when, for example, the same is attached to suitable tractor means. Also, it is preferred that certain driven mechanism of the portable grain bin 10 be powered by auxiliary means, not shown, such as a P.T.O. (power take-off) of a modern agricultural tractor for purposes of affording driving power to grain conducting means within or attached exteriorly to the grain bin, such as feed augers, to be described in detail hereinafter, and the elevating means of the substantially vertical elevator 14.

Extending within the upper horizontal portion 16 of the grain bin 10 is grain conducting means comprising an auger 18, shown in FIGS. 2, 4 and 5. In accordance with the invention, a grain conducting trough extension 20, into which the auger 18 also extends, is arranged to project horizontally from the end of the grain bin 10 with which the elevator 14 is associated. Any suitable discharge means such as chute 22 may be employed for discharging grain or the like into an automobile truck, another storage bin, or the like.

Pivotally associated at one end with the lower portion of elevator 14 is a grain trough 24 which has an auger 26 therein as shown in FIGS. 4, 5, 13 and 14. This trough 24 may be pivoted between the dotted and full line positions thereof shown in FIG. 13, the elevated position being the idle position thereof as when the trough is not needed or when the bin is being transported. The operative position is shown in FIG. 1 and any suitable leg means 28 may be provided to support the outer end of the same.

The inner end of the trough 24, when disposed in horizontal position, as shown in FIG. 1 communicates with an opening 30 in the front wall of the lower portion of the elevator 14. This opening normally is closed by a hinged door 32. The opening 30 is preferably sufficiently large that an operator can gain sufficient access to the interior of the lower part of the elevator 14 for purposes to be described hereinafter.

The elevator 14 comprises endless flexible means 34, specifically illustrated as sprocket chains, which pass around rotatably supported pulleys or sprocket gears 36 respectively adjacent the upper and lower ends of the elevator. The chains 34 have buckets or scoops 38 affixed thereto in longitudinally spaced relationship. The bucket conveyor is intended to travel in the direction of the arrows indicated in FIG. 4 and preferably is illustrative of a number of conventional flexible elevating means which can be used.

The bucket conveyor of the elevator is enclosed by a by-partite housing comprising a lower section 40 and an upper section 42. As is clear from FIGS. 4 and 5, the upper section 42 preferably telescopes into the upper end of lower section 40. Further, guide means 44 are provided within the lower portion of upper section 42 adjacent the upwardly movable flight of the bucket conveyor as to prevent contact of the buckets 38 with the lower end of upper section 42 of the housing during the operation of the bucket conveyor.

It is preferred that the upper section 42 be permitted sufficient vertical movement relative to the lower section that the upper end of the upper section 42 and particularly the upper end of the bucket conveyor supported thereby will be elevated adequately that the buckets 38, upon passing around the upper sprocket gear 36, readily can dump into the lateral conductor 46 which extends between the upper end of section 42 of the housing and grain conducting extension 20 which resembles a trough and contains the feed auger 18 therein.

To accomplish adequate elevating of the grain and insure ready discharge thereof by gravity into the conducting extension 20, it is preferred that the upper end of the upper section 42 of the housing extend an appreciable distance, of the order of 18 inches or 2 feet, for example, above the top of the grain bin 10 and the upper horizontal portion 16 thereof when the elevator 14 is functioning. However, in order that the upper end 42 will offer no impedance or obstruction to the traveling movements of the grain bin during transportation along a highway or otherwise, it is preferred and intended in accordance with the principles of the invention that the upper section 42 of the housing shall telescopically retract into the lower section 40, to the exemplary position shown, for example, in FIG. 5. It is to be understood that these dimensions which are indicated are purely exemplary and may be varied as desired in accordance with the principles of the invention.

Figure 6:
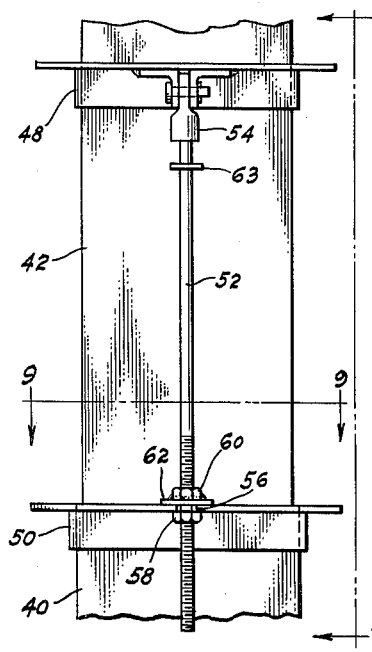
FIG. 6 is an enlarged vertical elevation of one side of the elevator shown in FIGS. 4 and 5 and illustrating one of a plurality of positioning means mounted in operative position.
Figure 9:
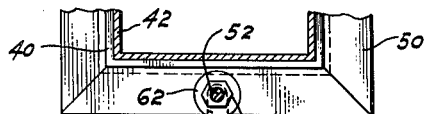
FIG. 9 is a fragmentary horizontal sectional view taken on the line 9—9 of FIG. 6.
Figure 10:
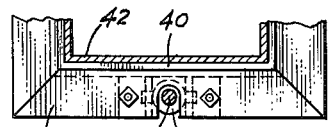
FIG. 10 is a fragmentary sectional view taken on the line 10—10 of FIG. 8.
Figure 11:
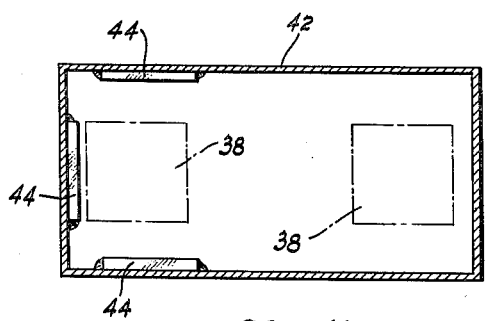
FIG. 11 is a somewhat enlarged horizontal sectional view taken on the line 11—11 of FIG. 4.
Figure 12:
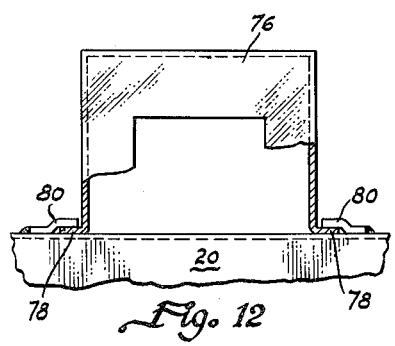
FIG. 12 is a fragmentary vertical view taken on the line 12—12 of FIG. 4.

To effect the retraction and elevation of the upper section 42 relative to lower section 40 of the housing, simple, relatively rugged means are utilized, comprising a frame 48 surrounding and affixed to upper section 42 intermediately of the ends thereof, and a second, similar frame 50 which surrounds and is fixed to the upper end of lower section 40 of the housing. These frames are provided with laterally extending flanges and a plurality of positioning and actuating means respectively are provided at opposite sides of the housing. One of said positioning means comprises a rod 52 which is threadably supported at its upper end by a pivoted clevis 54 carried by frame 48. By referring particularly to FIGS. 6, 7 and 9, it will be seen that the lateral flange of frame 50 is provided with a notch 56 which receives the rod 52. Said rod is threaded for a substantial portion of its length from the lower end upward, which threads engage a lower nut 58 and an upper nut 60 which preferably has a large washer 62 fixed thereto such as by welding. The washer 60 and lower nut 58 respectively engage opposite surfaces of the horizontal flange of frame 50 as clearly shown in full lines in FIGS. 6 and 7.

Figure 7:
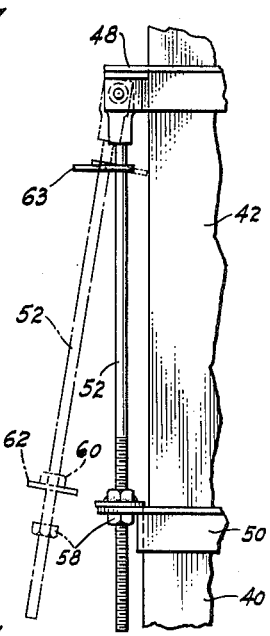
FIG. 7 is a side elevation at 90° to the vertical elevation of FIG. 6, as indicated by the line 7—7 of FIG. 6, and illustrating in full lines the positioning means arranged operatively to hold the upper section of the elevator housing elevated, and in broken lines shows said positioning means arranged in inoperative relationship relative to the housing of the elevator.

Adjacent the upper end of rod 52 is a transverse lug 63 which extends to one side of rod 52 a substantially greater distance than to the other side as shown in FIG. 7. Hence, when the short side of lug 63 is adjacent housing section 42, rod 52 may be disposed vertically as shown in full lines in FIG. 7. However, when the rod 52 is rotated 180°, the longer side of lug 63 will be disposed adjacent the housing section 42, whereby the rod 52 will be propped outward in the broken line position shown in FIG. 7, which is the inoperative position thereof.

Figure 8:
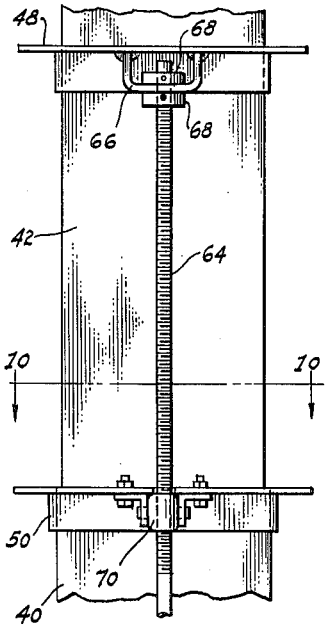

Adjacent the side of the housing of the elevator opposite rod 52 is a shaft 64 which is rotatable about its axis and extends between the frames 48 and 50. A suitable U-shaped bracket 66 is connected to frame 48 and the horizontal portion thereof has a hole to receive the upper end of shaft 64. Positioning collars 68 are fixed to the upper end of shaft 64 respectively adjacent opposite surfaces of the bracket 66 so as to prevent any appreciable movement of the shaft 64 in an axial direction. Shaft 64 is threaded for a substantial portion of its length and said threaded poriton extends through a threaded thimble 70 which is supported for restricted self-aligning movement by frame 50 as clearly shown in FIG. 8, whereby the thimble 70 will follow any existing deviations of shaft 64 during rotation thereof about its axis.

It will be obvious that as the shaft 64 is rotated in one direction, separative movement will be effected between frames 48 and 50 and correspondingly the upper housing 42 will be elevated relative to lower housing section 40. When the shaft 64 is rotated in the opposite direction, approaching movement between frames 48 and 50 will be effected so as to effect a retraction of upper housing section 42 into lower housing section 40.

Inasmuch as the frames 48 and 50 preferably are positioned above the elevator at a substantial elevation above the ground, the rotation of shaft 64 is facilitated by providing a crank extension 72 which is flexibly connected at its upper end of the lower end of shaft 64 by any preferably simple means such as those clearly shown in FIGS. 4 and 5.

When it is desired to change the position of upper housing section 42 relative to lower housing section 40, the lower nut 58 is loosened so as to permit the rod 52 to be rotated 180° to dispose the same in the outwardly propped position shown in FIG. 5 and also in broken lines in FIG. 7. When in this position, rod 52 offers no interference with the flange 50 while the upper housing section 42 is being elevated or retracted. It then is only necessary to rotate the crank extension 72 in the desired rotary direction to effect elevation or retraction of the upper housing section 42. When the desired position of section 42 is established relative to section 40, the nuts 58 and 60 on rod 52 are adjusted to dispose the same on opposite sides of the horizontal flange of frame 50 whereby the rod 52 cooperates with shaft 64 to securely hold the upper housing section 42 relative to the lower housing section 40.

The rotatable, elevating shaft 64 is mounted intentionally on the side of the housing from which the lateral conductor 46 projects in that such conductor and the mechanism attached thereto affords a sufficient amount of counter-balancing that binding and skewing of the upper housing section 42 relative to lower housing section 40 is minimized and actually is substantially eliminated. Further, as shown in FIG. 3, in order to guide the outer end of the lateral conductor 46 during the elevating and retracting movements of the upper housing section 42, vertical channels 74 are fixed to vertical plate means 74' carried by the grain conducting extension 20 and having an inlet opening 75 therein as shown in FIG. 3, and extensions of channels 74 which are severed therefrom are also fixed to the inner vertical wall of removable cover 76 which is horizontally slidable relative to the upper surface of conducting extensions 20. The frictional engagement between the flanges on lateral conductor 46 and the vertical channel 74 will afford a certain amount of drag that likewise tends to counter-balance any drag which may exist between upper housing section 42 and lower housing section 40. In effect, when elevating upper section 42, the force of rotatable shaft 64 is applied between the weight of section 42, and the weight of conductor 46 and friction of channels 74, thereby facilitating the ready vertical movement of upper housing section 42 by the rotation of shaft 64 which readily may be accomplished by a single operator. Further, the substantial vertical distance between the guide flanges on lateral conductor 46, which slide in channels 74, and the telescoping engagement of the lower end of upper housing section 42 and the upper end of lower housing section 40, further insures relatively smooth vertical movement of movable upper section 42 relative to stationary lower section 40, without cocking or canting and, therefore, without pinching and binding, when shaft 64 is rotated in either direction.

When upper housing section 42 is retracted to its substantially lowermost position, it will appear substantially as shown in FIG. 5 and in which position the outer end of lateral conductor 46 will be closed by plate means 74'. It will thus be seen that the upper end of section 42 is substantially only as high as the top of grain conducting extension 20, especially after the cover 76 thereof has been removed. When the section 42 is retracted to the position shown in FIG. 5, it is possible to slide a cover 76 to the left, as viewed in FIG. 4, by reason of the cover having opposed, outwardly extending guide and locking flanges 78 extending from opposite sides thereof and respectively received within guide channels 80 which are fixed to and carried by the upper surfaces of grain conducting extension 20. Hence, it will be seen from FIG. 4 particularly that when the housing section 42 is elevated, it will prevent disengaging sliding movement between cover 76 and guide channels 80, whereas suitable means such as a stop lug 82 prevents sliding movement in the opposite direction.

When the upper housing section 42 is retracted as described above to decrease the height of elevator 14, the chain bucket conveyor 34 will become bunched in the lower portion of the lower housing section 40 as somewhat diagrammatically shown by wavy broken lines in FIG. 5. The chain may become kinked during such bunching and, upon elevating the upper section 42 by rotation of shaft 64, such kinking readily may be straightened by an operator reaching through opening 30 in the lower portion of housing section 40. In addition to the upper section 42 being elevated to dispose the upper end at a desired height relative to grain conducting means 20, for example, such elevation also may be employed to effect take-up of any wear in the links of chain conveyor 34 which will cause gradual lengthening of said chain.

Referring to FIGS. 13 and 14, it will be seen that a feed auger 84 is provided in the lower portion of grain bin 10. In the preferred construction according to the invention, auger 84 comprises the drive shaft for lower sprocket gear 36 which drives the chain of the bucket conveyor 34. The sprocket 36 preferably is fixed to the shaft of auger 84 so as to be directly driven thereby. Rotatable support of said end of the shaft is afforded by suitable bearings 86. Said shaft is also preferably provided with an extension 88 having a transverse drive pin 90 extending therethrough. The auger 26 in trough 24 is provided with an appropriate drive connector 92 which is complementary to and readily separable from and connectable to the driving pin 90. Connection readily is established when the trough 24 is lowered to the broken line position shown in FIG. 13 and the disconnection between pin 90 and connector 92 is effected when the trough 24 is raised to the full line position shown in FIG. 13. It also is to be understood that the drive shaft and auger 84 are rotatable in a direction to feed grain from the bin 10 to the elevator 14 and, when so operating and auger 26 is connected thereto, the auger 26 within trough 24 will operate to feed grain from the trough to elevator 14 so that it may be raised thereby and discharged into the grain conducting extension 20. The flight lead of auger 26 is opposite that of auger 84 to accomplish this. Auger 18 selectively is reversibly rotatable and, depending upon its direction of rotation, the elevated grain will be discharged either into the top of the grain bin 10 or to the discharge chute 22. Auger 18 may be driven either by suitable connection to drive shaft 84, or the P.T.O., or any other power source, as desired.

While the invention has been described and illustrated in its several preferred embodiments, it should be understood that the invention is not to be limited to the precise details herein illustrated and described since the same may be carried out in other ways falling within the scope of the invention as claimed.

We claim:
1. A gain bin of substantial height, in combination with a grain elevator normally extending above said grain bin when in use and positioned relative to said bin to permit elevating grain and the like and discharging it into the top of said bin, said grain elevator comprising substantially vertical grain elevating means enclosed within a plural-part housing, the parts of which are slidable partially telescopically relative to each other longitudinally to shorten the elevator and thereby reduce the height thereof at least to approximately that of the grain bin, actuating means extending longitudinally between said parts of said housing offset from the longitudinal axis of said housing and exterior of one side of said housing and operable to move said parts of said housing longitudinally relative to each other, and means connected to the upper part of said housing at said one side thereof and operable to counter-balance said upper part relative to said actuating means, thereby to facilitate the vertical movement of said upper part by said actuating means.

2. A grain bin of substantial height, in combination with a grain elevator adjacent said bin and normally extending at its upper end above said grain bin when in operative position to permit elevating grain and the like and discharging it into the top of said bin, said grain elevator comprising grain elevating means enclosed within a substantially vertical housing comprising upper and lower parts telescopically slidable relative to each other for portions of the lengths thereof to afford vertical extension and retraction of said housing to effect reduction of the height thereof at least to approximately that of the grain bin, actuating means extending longitudinally between said parts of said housing and laterally offset from the longitudinal axis of said housing at one side thereof, said actuating means being operable to longitudinally extend and retract said parts of said housing to effect such reduction of the height of said elevator and extension thereof, and guide means for said upper part of said housing fixedly supported relative to said grain bin and spaced substantially above the lower end thereof and attached to said one side of said housing and cooperable with the slidably engaging portion of said lower end of the upper part of said housing relative to the lower part of said housing to prevent appreciable canting or binding between said upper and lower parts of said housing when adjusted longitudinally by said axially offset actuating means.

3. The grain bin set forth in claim 2 further characterized by said actuating means engaging said upper part of said housing intermediately of said guide means and the lower end which slidably telescopes with the lower part of said housing.

4. The grain bin set forth in claim 2 further characterized by said actuating means being exterior of said housing at said one side thereof and said guide means being offset laterally from the upper portion of said upper part of said housing a greater distance than said actuating means and said guide means also being above the location on said upper part of said housing where said actuating means engages said part.

5. The grain bin set forth in claim 2 further characterized by said actuating means comprising threaded shaft means having a crank interconnected to the lower end thereof and operable to effect elevation and retraction of the upper part of said housing relative to the lower part thereof, and said grain bin further including adjustment-maintaining means interengaging the parts of said housing adjacent the sides thereof opposite that on which said threaded shaft means are disposed and operable to cooperate with said shaft means to maintain said parts of said housing in desired adjusted position relative to each other.

6. The grain bin set forth in claim 5 further characterized by said adjustment-maintaining means comprising rod means movably connected at one end to one part of said housing and including holding means operable to space the opposite end of said means from the housing to prevent interference of said rod means with said housing parts while relatively adjusting the same.

7. A grain bin of substantial height, in combination with grain receiving and conveying means extending substantially horizontally along the upper portion of said grain bin and having an inlet opening therein, a grain elevator normally extending substantially vertically above said grain bin and grain receiving and conveying means thereon and adjacent the bin to permit elevating grain and the like and discharging it into said grain receiving and conveying means, said grain elevator comprising substantially vertical grain elevating means enclosed within upper and lower housing parts relatively movable longitudinally to permit lowering of the upper end of said housing at least to approximately that of the grain receiving and conveying means in the upper portion of said grain bin, discharge means on the upper portion of the upper housing part communicating with said inlet opening of said grain receiving and conveying means when said part is in elevated position, and means on said grain receiving and conveying means closing the discharge means of said upper housing part when the latter is in its lower position.

8. The grain bin set forth in claim 7 further including cover means extending upwardly from said grain receiving and conveying means and removably connected thereto to permit removal thereof from said receiving and conveying means to minimize the height thereof when said grain elevator is retracted.

9. The grain bin set forth in claim 8 further including connecting means on said receiving and conveying means slidably receiving said cover means for horizontal movement toward and from said grain elevator, the upper part of said grain elevator housing preventing sliding separative movement of said cover means when said upper housing part is elevated but such separative movement being possible when said upper housing part is retracted.

References Cited in the file of this patent

UNITED STATES PATENTS

| | | |
|---|---|---|
| 402,522 | Hart | Apr. 30, 1889 |
| 434,082 | Hart | Aug. 12, 1890 |
| 834,710 | Chervet | Oct. 30, 1906 |
| 893,620 | Gardner | July 21, 1908 |
| 1,510,546 | Cordier | Oct. 7, 1924 |
| 2,661,089 | Mercier | Dec. 1, 1953 |